United States Patent [19]

Ingle et al.

[11] Patent Number: 4,884,223
[45] Date of Patent: Nov. 28, 1989

[54] DYNAMIC FORCE MEASUREMENT SYSTEM

[75] Inventors: Lloyd D. Ingle, Valley Center; Henry V. Allen; James W. Knutti, both of Fremont, all of Calif.

[73] Assignee: Hybond, Inc., Escondido, Calif.

[21] Appl. No.: 170,036

[22] Filed: Mar. 22, 1988

Related U.S. Application Data

[63] Continuation of Ser. No. 752,967, Jul. 5, 1985, abandoned.

[51] Int. Cl.$^4$ .................. G01M 7/00; G01F 1/375; B25J 19/00
[52] U.S. Cl. ............................... 364/550; 364/508; 73/862.51; 73/862.52; 901/46
[58] Field of Search ............... 364/506, 508, 550, 556, 364/558, 567; 73/862.27, 862.51, 862.52, 862.53, 862.67; 901/33, 46

[56] References Cited

U.S. PATENT DOCUMENTS

| | | | |
|---|---|---|---|
| 4,368,790 | 1/1983 | Ives | 364/567 |
| 4,446,527 | 5/1984 | Runyan | 364/558 |
| 4,453,421 | 6/1984 | Umano | 364/506 |
| 4,468,968 | 9/1984 | Kee | 364/558 |
| 4,544,917 | 10/1985 | Lenhoff, Jr. | 341/158 |
| 4,574,358 | 3/1986 | Peterson et al. | 364/550 |
| 4,598,381 | 4/1986 | Cucci | 364/558 |
| 4,611,296 | 9/1986 | Niedermayr | 901/46 |
| 4,626,996 | 12/1986 | Arlott | 364/550 |
| 4,633,720 | 1/1987 | Dybel et al. | 73/862.53 |
| 4,709,342 | 11/1987 | Hosoda et al. | 901/46 X |
| 4,747,060 | 5/1988 | Sears, III et al. | 364/556 X |
| 4,806,193 | 2/1989 | Von Raben | 156/378 |

Primary Examiner—Parshotam S. Lall
Assistant Examiner—Joseph L. Dixon
Attorney, Agent, or Firm—Brown, Martin, Haller & McClain

[57] ABSTRACT

A dynamic force measurement system for taking a series of force measurements of a force applied against a sensor device whereby to determine, record, display and store the sequence of force measurements. The sensor device is adapted to respond to said force and provide an electronic force signal which is representative thereof. The dynamic force measurement system includes a central processing unit for operating a computer program, having data and program instruction storage means, graphic display and user interface means. A sensor interface device provides for the connecting of the sensor device to the central processing unit. The sensor interface device includes means for monitoring the force signal generated by the sensor device, converting the signal to a numerical binary format for recording in intermediate storage means within the sensor interface device for ultimate transfer to the central processing unit for display, statistical analysis and storage.

14 Claims, 7 Drawing Sheets

DYNAMIC FORCE MEASUREMENT SYSTEM

This is a continuation of application Ser. No. 752,967, filed July 5, 1985 now abandoned.

BACKGROUND OF THE INVENTION

The present invention relates to a system for measuring, recording and displaying the dynamic application of a physical force. More particularly it is concerned a system which receives the impact of a conventional wire bonding bond tool on a sensor device, dynamically and continuously monitors the instantaneous force of the bond tool, takes a series of measurements or readings of the applied force, records the force reading, displays the series of force readings and provides assorted statistical and physical analysis of the force readings.

Wire bonding devices have been developed to provide point-to-point wiring on integrated circuit chips. Typical of such device is the Hybond Model 624 Thermosonic Ball Bonder manufactured by Hybond, Inc. of Escondido, Calif. These wire bonding devices require a bond tool to strike the integrated circuit chips with sufficient force to promote the bonding of a wire to the integrated circuit chip, but avoid immediate or delayed failure of the integrated circuit chips.

Conventional methods of determining the force with which the bond tool strikes the chip is to take static measurements of the bond tool by delicate spring or balance measuring devices, or alternatively use force integrating type systems which detect the maximum force or some form of average force measurement. These prior art systems have proved to be totally inadequate for developing a true understanding of the dynamics of the force being applied to integrated circuit chip workpiece.

Characteristics of prior art force measuring systems is a complete absence of information relative to an analysis of the force as it is applied to the integrated circuit chip over the time duration of the tool impact. Accordingly, the existence of an impulse or spike force upon tool impact, tool bounce, or short or extended tool contact has simply been unavailable.

Because of the unavailability of the dynamic force information, very little has been known about the dynamics of the wire bonding operation. Prior to this invention, analysis of wire bond failures or bond life cycles has been slightly better than mere speculation.

SUMMARY OF THE INVENTION

The present invention provides a Dynamic Force Measuring System which senses the application of the force, quantifies the magnitude of the force, stores in numerical representation of the force magnitude all relative to a given instant in time then repetitively repeats this force measuring or reading sequence at a predetermined frequency for a predetermined duration of time. The stored representations of the force magnitude are graphically presented as force relative to time to provide a force profile. The system is capable of providing a variety of preselected statistical and physical analysis of the data such as, for example, maximum force, mean force, overforce, force duration, total energy of the force, and force rate. Further, the system provides the means for displaying multiple force profiles simultaneously for visual comparison. The displayed force profiles may be printed on a graphic printer to provide permanent records of such information. The system is capable of associating this dynamic force information with user defined initialization data for a particular operating environment.

The dynamic force measuring system of the present invention basically comprises a force sensor device for operation against a fixed support platform. The sensor device has a detecting surface and is capable of providing a continuous electronic force sensor signal whose electronic characteristics correspond to the force being applied to the sensor device at that instant.

A sensor interface device is connected directly to the sensor device to continuously monitor the force signal. The signal interface device includes a conventional analog-to-digital electronic circuit to take a force measurement or reading by converting the force signal into a binary or numeric representation of the force signal and therefore the force imposed on the sensor at the given sample time. The numeric representation is stored in temporary storage within the sensor interface device as a force measurement for the given sample time. The sensor interface device continuously monitors the force signal and takes a series of force readings at a predetermined frequency over a predetermined time duration. The numeric representation for each reading is temporarily stored relative to their respective sample time.

The operation of the sensor interface device is controlled by an interface controller in combination with interface storage means for interface program instructions and force data. Under control of the interface program, the interface controller accepts user defined operating parameters from the central processor relative to a given operating environment then effects the reading of the force data, temporary storage of the data, and transmittal of the data back to the central processor for the designated operating parameters.

The sensor interface device is connected to the central processor unit through a conventional RS-422 interface. The central process unit, through its dynamic force operating program and associated program instruction storage and data storage, provides means for controlling the operation of the various components of the system, accepting user initializing data and operating parameters for a given operating environment. The central processing unit also provides the interface device with necessary operating parameters for the given operating environment and accepts the collected force data from the interface device upon completion of the particular operation. The central processing unit also provides means for displaying the force data and for conducting preselected statistical and physical analysis of the force data. The central process unit includes a floppy disk storage device, a graphics display device, a graphics printer, and a user interface device.

The basic operation of the dynamic force measurement system is initiated by the user providing initialization data and operating parameters relative to a given operating environment. Initializing data includes general informational type data relative to the particular operating environment. Operating parameters include the identification of the particular operating instructions for dynamic force measurement system, including such things as operational run number; force range; calibration data; sample rate; and triggering mechanism.

Upon activation of a given run for a given operating environment, the central processing unit transmits the necessary operating parameters to the sensor interface device and awaits completion of the given run. The sensor interface device initializes its operation in accordance with the operating parameters and upon detection of a defined triggering stimulus the sensor interface device begins taking force readings. The sensor interface device initiates the collection of force readings upon activation of the defined triggering mechanism and repetitively continues to collect the series of force readings according to the user selected sampling rate. The readings are continually taken for the time duration specified by the user. Upon completion of the readings, all digital representations of the force data are transferred to the central processing unit.

According to the user specified operating parameters, the central processing unit will provide a graphical representation of the force data over time on the graphics display to provide the user with a visual force profile of the run. Additional statistical analysis of the force information is provided by the system according to user selected options.

In extended operational situations, the dynamic force measurement system of this invention is appropriate and suitable for monitoring and physical environment wherein it would be desirable to have a representation of the application of a force over a time duration. The sensor device would be selected to accommodate the anticipated range of force information. The sample rate and duration would be selected to provide meaningful and significant information relative to the particular application. Such a dynamic force measurement system in its general configuration would be appropriate, for example, in evaluating the forces experienced by a landing gear in a conventional airplane landing systems, for the vibrational forces experienced by bearings on a rocket engine.

In a further alternative version of the dynamic force measurement system of this invention continuous real time analysis of the force data would be conducted by the central processing unit and compared against a standard force profile to generate a feedback control signal which is responsive to the variance between the force data and the standard force profile. The feedback control signal would be used to control the force drive mechanism and/or a force damping mechanism. Accordingly, and in view of the above, it is a primary objective of the present invention, to provide a dynamic force measurement system for monitoring, detecting, converting, storing and analyzing force data.

It is another object of the present invention to provide a means for generating and displaying a series of such force data as a function of time and thereby providing a force profile.

It is another object of the present invention to provide a means for comparing one force profile with a second force profile for comparative analysis.

It is still another object of the present invention to provide a system which includes means for providing statistical analysis of the force data.

It is still another object of the present invention to provide a system which generates a feedback control signal responsive to a variance between a standard force profile and the currently generated force data.

BRIEF DESCRIPTION OF THE DRAWINGS

The following is a brief description of the accompanying drawings which show a preferred embodiment of the invention.

Figure 1:
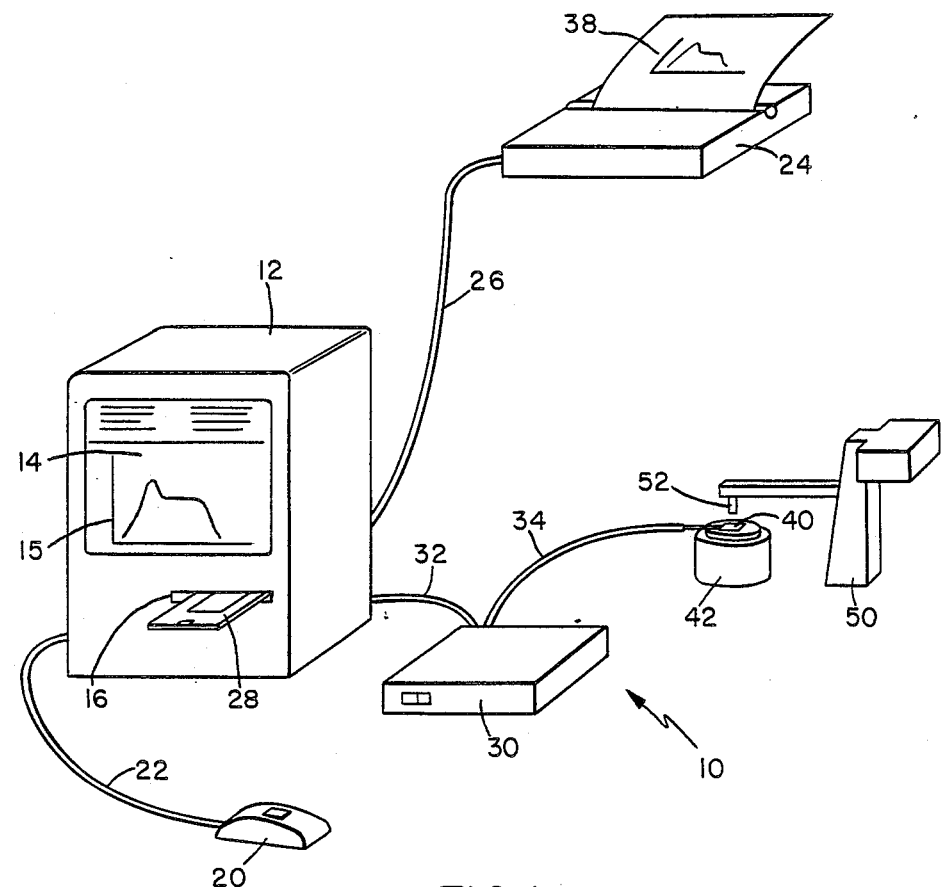
FIG. 1 is a pictorial view of a dynamic force measurement system of the present invention.

Table A is a listing of the dynamic force program of the central processing unit.

TABLE A

DYNAMIC FORCE PROGRAM

```
3
WINDOW CLOSE 1
CLEAR ,15500,1024
DEFINT A-Z
DIM S9(42)
F=0
T5=-1
X01=400:Y=225
X,=65:Y3=4+Y
OPEN"COM1:"AS#1 LEN=103
GOSUB 2
DIM I0(11,1),S(100),M(20),B9(3),R1(3),P(10)
DIM O4(100),M0(13),W(3),C0(3),D3(4),C(6)
GOSUB 5
RESTORE 6
READ T1,B5,T4,G0,T2,D,T3,F4,P4
FOR I=0 TO 10
READ P(I)
NEXT
S,1=.25
O7=F
FOR I=0 TO 6
READ M(14+I)
```

```
NEXT
READ D3(0),D3(1),D3(2),D3(3),D3(4)
FOR I=1 TO 10
READ T'(I)
NEXT
READ E9(0),E9(1),E9(2),E9(3)
READ C0(0),C0(1),C0(2),C0(3)
FOR I=0 TO 6
READ C(I)
NEXT
RESTORE 7
READ M.,I3,S9,T6$
WHILE M.<>-1
MENU M.,I3,S9,T6$
READ M.,I3,S9,T6$
WEND
CHAIN "H",,ALL,DELETE 3-4
7
DATA 1,0,1,"View",1,1,1,"Set Bonder Info...",1,2,0,"-",1,3,1,"1st Bond"
DATA 1,4,1,"2nd Bond",1,5,0,"-",1,6,1,"Set Offset...",1,7,1,"Set Defaults"
DATA 1,8,1,"Restore Defaults",1,9,1,"Redraw",1,10,1,"Quit"
DATA 2,0,1,"Data",2,1,1,"New",2,2,1,"Old...",2,3,1,"Overlay..."
DATA 2,4,1,"Save As...",2,5,1,"Erase..."
DATA 3,0,1,"Range",3,1,1,"900 grams",3,2,1,"225 grams"
DATA 4,0,1,"Time/Sample",4,1,1,"100 us",4,2,1,"200 us",4,3,1,"500 us"
DATA 4,4,1,"   1 ms",4,5,1,"   2 ms",4,6,1,"   5 ms",4,7,1," 10 ms"
DATA 4,8,1,"  20 ms",4,9,1,"  50 ms",4,10,1,"100 ms"
DATA 5,0,1,"Delay",5,1,1,"100 us",5,2,1,"200 us",5,3,1,"500 us"
DATA 5,4,1,"   1 ms",5,5,1,"   2 ms",5,6,1,"   5 ms",5,7,1," 10 ms"
DATA 5,8,1,"  20 ms",5,9,1,"  50 ms",5,10,1,"100 ms"
DATA 6,0,1,"Trigger",6,1,1,"Manual",6,2,1,"Automatic",6,3,1,"Threshold..."
DATA 7,0,1,"Print",7,1,1,"Tables",7,2,2,"Plot",7,3,1,"Bonder Info"
DATA 7,4,0,"-",7,5,1,"Do Print"
DATA -1,0,0,""
6
DATA 0,1,2,3,4,5,6,7,8,0,3,0,1,1,1,1,0,0,-1,0
DATA 5,5,&HF800,&HA800,&HF800,&HA800,&HF800
DATA 3,3,&HE000,&HA000,&HE000
DATA .1,.2,.5,1,2,5,.01,.02,.05,.1
DATA 4,65,230,466
DATA 6,66,230,465
DATA &H4E56,0,&H2F2E,8,&HA87B,&H4E5E,&H4E75
2
RESTORE 1
S8(40)=19459
FOR I=0 TO 25
READ S8(I)
NEXT
C1!=VARPTR(S8(0))
CALL C1!
RETURN
1
DATA &H41FA,&H32,&H317C,8,&H1A,&H317C,&HFFF9,&H18,&HA004
DATA &H317C,&HFFFA,&H18,&HA004,&H317C,&HA,&H1A,&H217C
DATA 0,0,&H1C,&H217C,0,0,&H20,&HA004,&H4E75
5
DIM C5%(33)
FOR I=0 TO 15:C5%(I)=128:NEXT
C5%(8)=-1
FOR I=16 TO 31:C5%(I)=0:NEXT
C5%(32)=8
C5%(33)=8
RETURN
4
13
DEFINT A-Z
WINDOW 2,"",(0,23)-(512,94),3
WINDOW 1,"",(4,97)-(508,341),3
49
```

```
ON ERROR GOTO 43
S5$="Defaults"
OPEN S5$FOR INPUT AS#2
ON ERROR GOTO 0
O7=F
D8=0:D6=0:O8=0
GOTO 24
44
A1=F:C4=T5
I1=T5:D4=F:D5=F
WINDOW 1
WINDOW OUTPUT 2
TEXTSIZE 9
X7=MOUSE(1):Y1=MOUSE(2)
IF(X7>B9(3))OR(X7<B9(1))OR(Y1>B9(2))OR(Y1<B9(0))THEN I1=F
IF I1=F THEN INITCURSOR:C5=A1
IF I1=T5 THEN CALL SETCURSOR(VARPTR(C5%(0))):C5=C4
11
    M2=MENU(0)
    IF M2<>0 GOTO 63
    S7=MOUSE(0)+4
    X8=X7:Y2=Y1
    X7=MOUSE(1):Y1=MOUSE(2):I1=T5
    IF(X7>B9(3))OR(X7<B9(1))OR(Y1>B9(2))OR(Y1<B9(0))THEN I1=F:INITCURSOR:C5=A1
    IF I1=F AND S7<>5 GOTO 11
    IF I1=F AND S7=5 GOTO 19
    IF C5=A1 THEN CALL SETCURSOR(VARPTR(C5%(0))):C5=C4
    X2=(X7-X.)*.25
    IF X7=X8 GOTO 14
    MOVETO 397,31
    PRINT USING F3$;X2*T!(D.);
    MOVETO 425,19:LINETO 425,32
    MOVETO 435,31
    PRINT USING"####";S(X2)*G+B5;
    MOVETO 465,19:LINETO 465,32
    IF O7=F GOTO 14
    M5=0
    IF X2-O8<101 AND X2-O8>-1 THEN M5=O6(X2-O8)*G+O3
    MOVETO 475,31
    PRINT USING"####";M5;
    MOVETO 511,19:LINETO 511,32
14
    ON S7 GOTO 11,12,21,11,64,30,11
12
    IF O7=F GOTO 11
    IF D7=F THEN D7=T5:D6=X7:D8=X7:D4=F:D5=F
    IF O8=CINT((X7-D6)*.25)GOTO 11
    WINDOW OUTPUT 1
    D8=X7
    O8=CINT((D8-D6)*.25)
    GOSUB 41
    WINDOW OUTPUT 2
    GOTO 11
41
    PENPAT VARPTR(W(0))
    PAINTRECT VARPTR(B9(0))
    PENNORMAL
42
    FRAMERECT VARPTR(B9(0))
    C1!=VARPTR(C(0))
    CALL C1!(VARPTR(C0(0)))
    PICTURE,B0$
    IF O7=T5 THEN PICTURE(O9*4,0)
    RETURN
30
    D7=F
    O8=(D8-D6)*.25
    GOTO 11
```

```
63
    M1=MENU(1)
    O5=F
    TEXTSIZE 12
    ON M2 GOTO 65,33,56,58,55,59,57
1
    DEFINT A-Z
    IF M2=1 AND M1=1 THEN GOSUB 23:GOTO 62
    IF O5=T5 THEN O5=F:GOSUB 23:GOTO 62
2
    TEXTSIZE 9
    MENU
    GOTO 11
65
    ON M1 GOTO 67,2,8,8,2,71,70,49,31,47
67
    CHAIN"B",,ALL,DELETE 13-32
8
    MENU 1,P(B8),1
    P(B8)=M1
    MENU 1,P(B8),2
    GOTO 2
71
    CHAIN"T",3,ALL,DELETE 13-32
7   DEFINT A-Z
    IF A0=T5 GOTO 61
    X4=P(G0):X6=P(T2):P(G0)=D1:P(T2)=D.
    IF O7=F THEN B5=P(F4):GOSUB 39ELSE O3=P(F4):GOSUB 40
    GOSUB 41
    P(G0)=X4:P(T2)=X6
    GOTO 61
31
    GOSUB 23
61
    GOSUB 38
62
    MENU
    GOTO 44
70
    GOSUB 54
    GOTO 2
54
    OPEN"Defaults"FOR OUTPUT AS#2
    GOSUB 66
    CLOSE#2
    RETURN
66
    RESTORE 37
    FOR I=1 TO 10
        READ R,C2
        IF C2>8 THEN X=1ELSE X=0
        PRINT#2,MKI$(IO(R,X));
        NEXT
    FOR I=0 TO 7
        PRINT#2,MKI$(P(I));
        NEXT
    FOR I=1 TO 60:PRINT#2,"0";:NEXT
    RETURN
48
    ON ERROR GOTO 10
    FOR I=1 TO 6
        MENU I,P(I),1
        NEXT
    RESTORE 37
    FOR I=1 TO 10
        READ R,C2
        IF C2>8 THEN X=1ELSE X=0
        IO(R,X)=CVI(INPUT$(2,#2))
        NEXT
```

```
    FOR I=0 TO 7
        P(I)=CVI(INPUT$(2,#2))
        NEXT
    FOR I=1 TO 6:J0$=INPUT$(10,#2):NEXT
    MENU 1,P(B8),2
    FOR I=3 TO 6
        MENU I,P(I),2
        NEXT
    IF P(G0)=1 THEN B.!=.25ELSE B.!=1
    ON ERROR GOTO 0
    RETURN
37
    DATA   1,5,2,5,5,1,5,10,6,1,6,10,7,1,7,10,10,5,11,5
10
    CALL S4("Sorry, "+S5$+" is not a valid Data file.")
    CLOSE#2
    CHAIN"View",,ALL,DELETE 13-32
43
    GOSUB 54
    RESUME
33
    IF M1<>3 AND M1<>4 THEN O7=F:O4$=""
    ON M1 GOTO 5,26,27,28,25
5
    GOSUB 53
    IF O5=T5 GOTO 31
    WINDOW 2,"",(0,23)-(512,94),-3
    CLS
    BUTTON 1,1,"Cancel",(350,25)-(410,45),1
    IF P(T4)>0 GOTO 35
    MOVETO 100,40:PRINT"Is it OK to start sampling?";
    BUTTON 2,1,"OK",(280,25)-(340,45),1
    WHILE DIALOG(0)<>1:WEND
    B6=DIALOG(1)
    BUTTON CLOSE 2
    IF B6=1 GOTO 29
35
    MOVETO 100,40:PRINT"Sampling in Progress...        ";
    C3$=CHR$(&HA0)
    J0$=INPUT$(LOC(1),#1)
    PRINT#1,C3$;
    WHILE LOC(1)<>102 AND DIALOG(0)<>1
        WEND
    IF LOC(1)<>102 GOTO 15
    E$=INPUT$(1,#1)
    FOR I=0 TO 100
        S(I)=ASC(INPUT$(1,#1))
        NEXT
    GOSUB 39
    B7$="":O4$="":O7=F:B2=P(B8)
    WINDOW OUTPUT 2
29
    BUTTON CLOSE 1
    CLS
    GOTO 31
15
    CALL S4(STR$(LOC(1)-1)+" Samples Received!")
    FOR I=1 TO 100
        PRINT#1,CHR$(0);
        NEXT
    GOTO 29
23
    WINDOW OUTPUT 1
    CLS
    TEXTMODE 1
    FOR I=0 TO 9
        MOVETO X.,Y3-I*25
        CALL LINE(-2,0)
        MOVETO 15,Y3-I*25+6
```

```
            PRINT USING"###";I*Y0;
            PRINT" g";
            NEXT
       IF D.<4 OR D.>9 THEN F3$="##.#"
       IF D.>3 AND D.<7 THEN F3$="###"
       IF D.>6 AND D.<10 THEN F3$="#.##"
       IF D.<7 THEN U$=" ms"ELSE U$=" s   "
       RESTORE 22
       FOR I=1 TO D.:READ D0!:NEXT
       FOR I=0 TO 5
            MOVETO X.+I*80,Y3
            CALL LINE(0,2)
            MOVETO X.+I*80-22,Y3+14
            IF I<>0 THEN PRINT USING F3$;I*D0!;ELSE PRINT USING"###";I;
            PRINT U$;
            NEXT
       TEXTMODE 0
       GOSUB 42
       RETURN
22
       DATA  2,4,10,20,40,100,.2,.4,1,2
64
       IF D4=F GOTO 11
       HIDECURSOR
       D5=T5
       D4=F
       S1=X2*4+X.:S2=Y3-S(X2)-B3!:X5=X2
       IF S2>Y3 THEN S2=Y3
       IF S2<Y3-Y THEN S2=Y3-Y
       WINDOW OUTPUT 1
       PUT(F1-2,F2-2)-(F1+2,F2+2),M(0),PSET
       GET(S1-2,S2-2)-(S1+2,S2+2),M(7)
       IF O7=F GOTO 20
            PUT(F1-2,F0-2)-(F1+2,F0+2),M0(0),PSET
            S0=Y3
            IF X2-O8<101 AND X2-O8>-1 THEN S0=S0-O6(X2-O8)-O2!
            IF S0>Y3 THEN S0=Y3
            IF S0<Y3-Y THEN S0=Y3-Y
            GET(S1-2,S0-2)-(S1+2,S0+2),M0(7)
            PUT(F1-2,F0-2)-(F1+2,F0+2),M(14),PSET
            PUT(S1-2,S0-2)-(S1+2,S0+2),M(14),PSET
20
       PUT(F1-2,F2-2)-(F1+2,F2+2),M(14),PSET
       PUT(S1-2,S2-2)-(S1+2,S2+2),M(14),PSET
       WINDOW OUTPUT 2
       M7!=X2*T!(D.):M9=S(X2)*G+B5:D00!=ABS(M7!-M6!):D01=ABS(M9-M8)
       MOVETO 397,55
       PRINT USING F3$;M7!;
       MOVETO 435,55
       PRINT USING"####";M9;
       MOVETO 397,67
       PRINT USING F3$;D00!;
       MOVETO 435,67
       PRINT USING"####";D01;
       MOVETO 425,44:LINETO 425,71
       MOVETO 465,44:LINETO 465,71
       P5=124
       GOSUB 34
       MOVETO 168,19:LINETO 168,70
       IF O7=F THEN SHOWCURSOR:GOTO 11
       M5=0
       IF X2-O8<101 AND X2-O8>-1 THEN M5=O5(X2-O8)*G+O3
       D2=ABS(M5-M4)
       MOVETO 475,55
       PRINT USING"####";M5;
       MOVETO 475,67
       PRINT USING"####";D2;
       MOVETO 511,44:LINETO 511,71
       P5=202
       GOSUB 34
```

```
        MOVETO 246,19:LINETO 246,70
        MOVETO 315,19:LINETO 315,70
        MOVETO 335,19:LINETO 335,70
        SHOWCURSOR
        GOTO 11
19
    WINDOW OUTPUT 1
    IF D4=F GOTO 17
    D4=F
    PUT(F1-2,F2-2)-(F1+2,F2+2),M(0),PSET
    IF O7=T5 THEN PUT(F1-2,F0-2)-(F1+2,F0+2),M0(0),PSET
17
    IF D5=F GOTO 18
    D5=F
    PUT(F1-2,F2-2)-(F1+2,F2+2),M(0),PSET
    PUT(S1-2,S2-2)-(S1+2,S2+2),M(7),PSET
    IF O7=T5 THEN PUT(F1-2,F0-2)-(F1+2,F0+2),M0(0),PSET:PUT(S1-2,S0-2)-(S1+2,S0+2),M0(7),PSET
18
    WINDOW OUTPUT 2
    INITCURSOR
    C5=A1
    GOTO 11
21
    IF D4=T5 GOTO 11
    WINDOW OUTPUT 1
    IF O7=T5 THEN IF D5=T5 THEN PUT(F1-2,F0-2)-(F1+2,F0+2),M0(0),PSET:PUT(S1-2,S0-2)-(S1+2,S0+2)
,M0(7),PSET
    IF D5=T5 THEN PUT(F1-2,F2-2)-(F1+2,F2+2),M(0),PSET:PUT(S1-2,S2-2)-(S1+2,S2+2),M(7),PSET:D5=F
    F1=X2*4+X.:F2=Y3-S(X2)-B3!:X3=X2
    IF F2>Y3 THEN F2=Y3
    IF F2<Y3-Y THEN F2=Y3-Y
    GET(F1-2,F2-2)-(F1+2,F2+2),M(0)
    IF O7=F GOTO 16
        F0=Y3
        IF X2-O8<101 AND X2-O8>-1 THEN F0=F0-O6(X2-O8)-O2!
        IF F0>Y3 THEN F0=Y3
        IF F0<Y3-Y THEN F0=Y3-Y
        GET(F1-2,F0-2)-(F1+2,F0+2),M0(0)
        PUT(F1-2,F0-2)-(F1+2,F0+2),M(14),PSET
16
    PUT(F1-2,F2-2)-(F1+2,F2+2),M(14),PSET
    WINDOW OUTPUT 2
    D4=T5
    M6!=X2*T!(D.):M8=S(X2)*G+B5
    MOVETO 397,43
    PRINT USING F3$;M6!;
    MOVETO 425,32:LINETO 425,44
    MOVETO 435,43
    PRINT USING"####";M8;
    MOVETO 465,32:LINETO 465,44
    IF O7=F GOTO 11
    M4=0
    IF X2-O8<101 AND X2-O8>-1 THEN M4=O6(X2-O8)*G+O3
    MOVETO 475,43
    PRINT USING"####";M4;
    MOVETO 511,32:LINETO 511,44
    GOTO 11
38
    WINDOW OUTPUT 2
    CLS
    TEXTSIZE 9
    T0=57
    MOVETO 3,9
    PRINT"MEASURE    UNITS       BASE        OVERLAY       DIFFERENCE";
    PRINT TAB(T0);"LOCATE     TIME      BASE     OVERLAY"
    MOVETO 3,19
    PRINT"Name";TAB(16);LEFT$(B7$,13);TAB(29);LEFT$(O4$,13);TAB(67);U$+"    grams      grams"
    PRINT"Mean Force";TAB(11);"grams";TAB(T0);" Present"
    PRINT"Force Droop";TAB(11);"g/";U$;TAB(T0);" 1st Mark"
    PRINT"Overshoot";TAB(11);"%";TAB(T0);" 2nd Mark"
    PRINT"Energy";TAB(11);"g-";U$;TAB(T0);" Difference";
    RESTORE 51
    READ P6,P7,L,L0
    WHILE P6<>1000
```

```
        MOVETO P6,P7:LINETO L,L0
        READ P6,P7,L,L0
        WEND
    WINDOW OUTPUT 1
    RETURN
51
    DATA  0,10,315,10,335,10,511,10,390,20,511,20
    DATA  0,0,315,0,335,0,510,0,0,0,0,70,0,70,315,70,335,70,511,70
    DATA  511,0,511,70
    DATA  57,0,57,70,90,0,90,70,168,0,168,70,246,0,246,70
    DATA  315,0,315,70,335,0,335,70,390,0,390,70,425,0,425,70
    DATA  465,0,465,70
    DATA  1000,0,0,0
-34
    IF X3>X5 THEN X4=X5:X6=X3ELSE X4=X3:X6=X5
    IF P5<>124 GOTO 45
    B1!=0
    FOR I=X4 TO X6
        B1!=B1!+S(I)+B3!
        NEXT
    B1!=B1!*G
    IF M7!<>M6!THEN D9!=(M8-M9)/(M7!-M6!)ELSE J!=D9!:D9!=0
    B!=(B1!-(S(X3)+S(X5))*G*.5-B5)*T!(D.)
    B1!=B1!/(X6-X4+1)
    P0=P1:A2!=B1!
    GOTO 50
45
    O0!=0
    FOR I=X4 TO X6
        IF I-08<101 AND I-08>-1 THEN O0!=O0!+O6(I-08)+O2!
        NEXT
    IF M7!<>M6!THEN J!=D9!:D9!=(M4-M5)/(M7!-M6!)ELSE J!=D9!:D9!=0
    IF X3-08<101 AND X3-08>-1 THEN X0=O6(X3)ELSE X0=-O3
    IF X5-08<101 AND X5-08>-1 THEN X1=O6(X5)ELSE X1=-O3
    O!=(O0!-(X0+X1)*G*.5-O3)*T!(D.)
    O0!=O0!*G/(X6-X4+1)
    P0=P2:A2!=O0!:K!=S3!
50
    MOVETO P5-6,31
    IF P5=124 THEN PRINT USING"####.##";B1!;ELSE PRINT USING"####.##";O0!;:MOVETO 262,31:PRINT USING"#####.##";B1!-O0!;
    MOVETO P5-19,43
    PRINT USING"######.##";D9!;
    IF P5<>124 THEN MOVETO 273-19,43:PRINT USING"######.##";J!-D9!;
    IF A2!<>0 THEN S3!=100*ABS((P0-A2!)/A2!)ELSE S3!=999999!
    IF(A2!=0 AND P0=0)OR A2!=P0 THEN S3!=0
    MOVETO P5-19,55
    IF S3!<999999! THEN PRINT USING"######.##";S3!;ELSE PRINT"overrange";
    MOVETO 273-19,55
    IF P5<>124 AND S3!<999999! AND K!<999999! THEN PRINT USING"######.##";K!-S3!;ELSE IF P5<>124 THEN PRINT"overrange";
    MOVETO P5-19,67
    IF P5=124 THEN PRINT USING"######.##";B!;ELSE PRINT USING"######.##";O!;:MOVETO 273-19,67:PRINT USING"######.##";B!-O!;
    RETURN
28
IF O7=T5 THEN CALL S4("Only the BASE curve will be saved."):SWAP P(B8),B2
S5$=DATE$
S5$=RIGHT$(S5$,2)+LEFT$(S5$,2)+MID$(S5$,4,2)
J0$=TIME$
S5$=S5$+LEFT$(J0$,2)+MID$(J0$,4,2)+" "
IF P(G0)=1 THEN J0$="H"ELSE J0$="L"
S5$=S5$+J0$+RIGHT$(STR$(P(T2)-1),1)
ERASE S8
DIM S8(64)
RESTORE 75
FOR I=0 TO 31
READ S8(I)
NEXT
J0$=S5$
P8=45
GOSUB 76
J0$="Name the Data File :"
P8=32
```

```
GOSUB 76
C1!=VARPTR(S8(0))
CALL C1!
V=S8(35)
IF ASC(LEFT$(MKI$(S8(32)),1))=0 THEN S5$="":GOTO 72
P8=37
GOSUB 73
S5$=J0$
RESTORE 74
FOR I=0 TO 32
READ S8(I)
NEXT
FOR I=33 TO 47
S8(I)=0
NEXT
C1!=VARPTR(S8(0))
CALL C1!(V)
P8=33
GOSUB 73
J0$=J0$+":"+S5$
72
ERASE S8
DIM S8(42)
IF S5$="" GOTO 31
OPEN J0$FOR OUTPUT AS#2
P(F4)=B5
GOSUB 66
FOR I=0 TO 100
PRINT #2,MKI$(S(I));
NEXT
IF O7=T5 THEN SWAP P(B8),B2:P(F4)=O3
B7$=S5$
CLOSE#2
75
DATA &H4E56,&HFFB4,&H48E7,&H80F8,&H47FA,&H36,&H2F3C,30,100,&H2F0B
DATA &H49EB,&H1A,&H2F0C,&H2F3C,0,0,&H49EE,&HFFB6,&H2F0C,&H3F3C,1
DATA &HA9EA,&H203C,0,&H4A,&H204C,&H224B,&HA02E,&H4CDF,&H1F01
DATA &H4E5E,&H4E75
74
DATA &H4E56,0,&H48E7,&H80F0,&H302E,8,&H41F8,&H356,&H2468,2
DATA &H2668,6,&HB06A,&H4E,&H670C,&HB7CA,&H6718,&H246A,0
DATA &H4EFA,&HFFEC,&H41EA,&H2C,&H43FA,&H12,&H4280,&H103C,&H1C
DATA &HA02E,&H4CDF,&HF01,&H4E5E,&H4E75
76
S8(P8)=LEN(J0$)*256+ASC(LEFT$(J0$,1))
I=2:J=1
WHILE I<=LEN(J0$)
S8(P8+J)=ASC(MID$(J0$,I,1))*256
I=I+1
IF I<=LEN(J0$) THEN S8(P8+J)=S8(P8+J)+ASC(MID$(J0$,I,1)):I=I+1:J=J+1
WEND
RETURN
73
J0$=MKI$(S8(P8))
J=ASC(LEFT$(J0$,1))
IF J=0 THEN J0$="":RETURN
J0$=RIGHT$(J0$,1)
K0=FIX((J-1)*.5)
FOR I=P8+1 TO P8+K0
J0$=J0$+MKI$(S8(I))
NEXT
IF (J-1)*.5>K0+.1 THEN J0$=J0$+LEFT$(MKI$(S8(I)),1)
RETURN
27
    O7=T5
26
    S5$=FILES$(1,"TEXT")
    IF LEN(S5$)=0 AND O7=T5 THEN O7=F:O4$=""
    IF LEN(S5$)=0 GOTO 31
    OPEN S5$FOR INPUT AS#2
```

```
        IF O7=F THEN B4$=S5$
        FOR I=1 TO LEN(S5$)
            IF MID$(S5$,I,1)=":"THEN J=I:I=LEN(S5$)
            NEXT
        S5$=RIGHT$(S5$,LEN(S5$)-J)
24
        GOSUB 48
        I=0
        IF O7=T5 GOTO 46
        B7$=S5$:O4$="":B2=P(B8):B5=P(F4)
        WHILE NOT EOF(2)
            S(I)=CVI(INPUT$(2,#2))
            I=I+1
            WEND
        FOR J=I TO 100:S(J)=0:NEXT
        CLOSE#2
        GOSUB 39
        GOTO 31
39
        WINDOW OUTPUT 1
        D.=P(T2)
        D1=P(G0)
        IF D1=1 THEN Y0=100:G=4ELSE Y0=25:G=1
        X9=X.
        P3=0
        B3!=B5/G
        PICTURE ON
        MOVETO X.,Y3-S(0)-B3!
        FOR I=1 TO 100
            X9=X9+4
            LINETO X9,Y3-S(I)-B3!
            IF P3<S(I)THEN P3=S(I)
            NEXT
        PICTURE OFF
        B0$=PICTURE$
        P1=P3*G+B5
        RETURN
46
        IF P(T2)<>D. OR P(G0)<>D1 THEN CLOSE#2:CALL S4("Time bases or force ranges are unequal!"):O7
=F:O4$="":ON ERROR GOTO 4:OPEN B4$FOR INPUT AS#2:ON ERROR GOTO 0:GOSUB 48:CLOSE#2:GOTO 3:
        O4$=S5$:O1=P(B8):O3=P(F4)
        WHILE NOT EOF(2)
            O6(I)=CVI(INPUT$(2,#2))
            I=I+1
            WEND
        FOR J=I TO 100:O6(J)=0:NEXT
        CLOSE#2
        GOSUB 40
        GOTO 31
4
        CALL S4("Warning: check bond information before saving this data.")
        RESUME 31
40
        WINDOW OUTPUT 1
        D8=0:D6=0:O8=0
        X9=X.
        P3=0
        O2!=O3/G
        PICTURE ON
        MOVETO X.,Y3-O6(0)-O2!
        X9=X9-1
        PUT(X9,Y3-O6(0)-O2!-1),D3(0),PSET
        FOR I=1 TO 100
            X9=X9+5
            LINETO X9,Y3-O6(I)-O2!
            X9=X9-1
            PUT(X9,Y3-O6(I)-O2!-1),D3(0),PSET
            IF P3<O6(I)THEN P3=O6(I)
            NEXT
        PICTURE OFF
        P2=P3*G+O3
        RETURN
```

```
25
    CHAIN"E",,ALL,DELETE 13-32
6
    DEFINT A-Z
    GOTO 31
56
    MENU 3,P(G0),1
    IF M1=1 THEN B.!=.25ELSE B.!=1:LPRINT FRE(-2),FRE(-1),FRE(0)
    P(G0)=M1
    MENU 3,P(G0),2
    GOTO 2
58
    MENU 4,P(T2),1
    P(T2)=M1
    MENU 4,P(T2),2
    GOTO 2
52
    J0$=INPUT$(LOC(1),#1)
    PRINT#1,C3$;
    S6=0
    G1=LOC(1)
    WHILE G1<>1 AND S6<49
        S6=S6+1
        G1=LOC(1)
    WEND
    IF LOC(1)<>1 THEN O5=T5:RETURN
    E$=INPUT$(1,#1)
    IF C3$<>E$THEN O5=T5
    RETURN
55
    MENU 5,P(D),1
    P(D)=M1
    MENU 5,P(D),2
    GOTO 2
59
    A0=F
    IF M1=3 GOTO 69
    IF M1=1 THEN P(T4)=0ELSE P(T4)=2
    GOTO 60
3
    DEFINT A-Z
    IF A0=T5 GOTO 61
60
    MENU 6,P(T3),1
    P(T3)=M1
    MENU 6,P(T3),2
    IF P(T4)=0 OR P(T4)=2 GOTO 62
    GOTO 61
69
    CHAIN"T",1,ALL,DELETE 13-32
53
    O5=F
    C3$=CHR$(&H88+P(T4))
    GOSUB 52
    C3$=CHR$(((P(T1)-P(F4))*B.!)AND &HFF)
    GOSUB 52
    C3$=CHR$(&H90+P(D)-1)
    GOSUB 52
    C3$=CHR$(P(T2)-1)
    GOSUB 52
    C3$=CHR$(100)
    GOSUB 52
    C3$=CHR$(&HC0)
    GOSUB 52
    C3$=CHR$(P(G0)*16)
    GOSUB 52
    IF O5=F THEN RETURN
9
    IF LOC(1)<1 THEN CALL S4("Command not received!")
    IF LOC(1)>1 THEN CALL S4("Excess data in buffer!")
```

```
    IF LOC(1)=1 THEN CALL S4("Incorrect command echo!")
    RETURN
47
    MENU RESET
    SYSTEM
57
    IF M1>3 GOTO 68
    IF P(P4+M1-1)=F THEN P(P4+M1-1)=T5ELSE P(P4+M1-1)=F
    MENU 7,M1,ABS(P(P4+M1-1))+1
    GOTO 2
68
    CHAIN"P",,ALL,DELETE 13-32
SUB S4(M3$)STATIC
    SHARED O5,T5
    O5=T5
    BEEP
    WINDOW 2
    CLS
    MOVETO 5,21:PRINT M3$;
    BUTTON 1,1,"OK",(405,5)-(435,25),1
    J0=DIALOG(0)
36      IF DIALOG(0)<>1 THEN 36
    BUTTON CLOSE 1
    END SUB
32
1
DEFINT A-Z
R2=35
C8=260
WINDOW 1,,(4,97)-(508,341),-3
CLS
RESTORE 10
READ I,J,J0$
WHILE I<>-1
MOVETO I,J
PRINT J0$;
READ I,J,J0$
WEND
READ R0(1),R0(0),R0(3),R0(2)
WHILE R0(1)<>-1
FRAMERECT VARPTR(R0(0))
READ R0(1),R0(0),R0(3),R0(2)
WEND
FOR I=1 TO 10
READ R,C2
IF C2>S THEN X=1ELSE X=0
X=I0(R,X)
GOSUB 11
NEXT
BUTTON 1,1,"OK",(425,100)-(475,150),1
A0=T5
WHILE A0=T5
A3=DIALOG(0) :M00=MOUSE(0)
WHILE M00=0 AND A3<>1:M00=MOUSE(0):A3=DIALOG(0):WEND
IF A3=1 THEN A0=F
F5=F
WHILE M00<0
C2=INT((MOUSE(3)-C8+7)*.125)
R=INT((MOUSE(4)-R2+32)*.05)
ON R GOTO 3,3,7,7,4,4,4,7,7,3,3
GOTO 7
4
IF C2>0 AND C2<5 GOTO 2
IF C2<9 OR C2>12 GOTO 7
X=I0(R,1)
H$=STR$(X)
IF LEN(H$)>12-C2 THEN H$=MID$(H$,LEN(H$)+C2-12,1)ELSE H$="0"
IF VAL(H$)=9 THEN X=X-9*10^(12-C2)ELSE X=X+10^(12-C2)
I0(R,1)=X
GOTO 8
```

```
3
IF C2<5 OR C2>8 GOTO 7
X=I0(R,0)
H$=STR$(X)
IF LEN(H$)>8-C2 THEN H$=MID$(H$,LEN(H$)+C2-8,1)ELSE H$="0"
IF VAL(H$)=9 THEN X=X-9*10^(8-C2)ELSE X=X+10^(8-C2)
I0(R,0)=X
GOTO 8
2
X=I0(R,0)
H$=STR$(X)
IF LEN(H$)>4-C2 THEN H$=MID$(H$,LEN(H$)+C2-4,1)ELSE H$="0"
IF VAL(H$)=9 THEN X=X-9*10^(4-C2)ELSE X=X+10^(4-C2)
I0(R,0)=X
8
GOSUB 11
7
IF F5=F THEN GOSUB 12
M00=MOUSE(0)
WEND
WEND
BUTTON CLOSE 1
WINDOW 1,,(4,97)-(509,341),3
CHAIN "H",1,ALL,DELETE 1-5
10
DATA 120,15,"BONDER IDENTIFICATION",125,35,"Manufacture Date"
DATA 125,55,"Serial Number",120,95,"BOND PARAMETERS :"
DATA 250,95,"1st Bond",320 ,95,"2nd Bond"
DATA 125,115,"Ultrasonic Energy",125,135,"Bond Time"
DATA 125,155,"Bond Force",120,195,"BONDER PARAMETERS"
DATA 125,215,"Stage Temperature ('C)",125 ,235,"EFO Power",-1,0,""
DATA 120,20,390,60,120,100,390,160,120,200,390,240,-1,0,0,0
DATA 1,5,2,5,5,1,5,10,6,1,6,10,7,1,7,10,10,5,11,5
11
MOVETO C5+32*INT((C2-1)*.25),R2+(R-1)*20
IF X<1000 THEN PRINT "0";
IF X<100 THEN PRINT "0";
IF X<10 THEN PRINT "0";
PRINT RIGHT$(STR$(X),LEN(STR$(X))-1);
RETURN
12
S6=0
M00=MOUSE(0)
WHILE S6<49 AND M00<0
S6=S6+1
M00=MOUSE(0)
WEND
IF S6=49 THEN F5=T5
RETURN
5
2
DEFINT A-Z
S5$=FILES$(1,"TEXT")
IF LEN(S5$)=0 GOTO 6
FOR I=1 TO 7:MENU I,0,0:NEXT
OPEN S5$ FOR INPUT AS#2
B4$=S5$
FOR I=1 TO LEN(S5$)
IF MID$(S5$,I,1)=":" THEN J=I
NEXT
D02$=LEFT$(S5$,J-1)
S5$=RIGHT$(S5$,LEN(S5$)-J)
GOSUB 10
I=0
S7$=S5$:O4$="":B2=P(B3):B5=P(F4)
WHILE NOT EOF(2)
S(I)=CVI(INPUT$(2,#2))
I=I+1
WEND
FOR J=I TO 100:S(J)=0:NEXT
```

```
CLOSE #2
GOSUB 9
GOSUB 4
WINDOW 2
CLS
MOVETO 1,40:PRINT"Is it OK to erase file ";S5$;" on disk ";D02$;"?";
BUTTON 1,1,"Cancel",(450,25)-(510,45),1
BUTTON 2,1,"OK",(380,25)-(440,45),1
WHILE DIALOG(0)<>1:WEND
B6=DIALOG(1)
BUTTON CLOSE 1
BUTTON CLOSE 2
CLS
FOR I=1 TO 7:MENU I,0,1:NEXT
IF B6=1 GOTO 6
KILL B4$
6
CHAIN"H",6,ALL,DELETE 2-5
10
ON ERROR GOTO 1
FOR I=1 TO 6
MENU 1,P(I),1
NEXT
RESTORE 8
FOR I=1 TO 10
READ R,C2
IF C2>8 THEN X=1 ELSE X=0
10(R,X)=CVI(INPUT$(2,#2))
NEXT
FOR I=0 TO 7
P(I)=CVI(INPUT$(2,#2))
NEXT
FOR I=1 TO 6:J0$=INPUT$(10,#2):NEXT
MENU 1,P(B8),2
FOR I=3 TO 6
MENU 1,P(I),2
NEXT
IF P(G0)=1 THEN B.!=.25 ELSE B.!=1
ON ERROR GOTO 0
RETURN
8 DATA 1,5,2,5,5,1,5,10,6,1,6,10,7,1,7,10,10,5,11,5
4
WINDOW OUTPUT 1
CLS
TEXTMODE 1
FOR I=0 TO 9
MOVETO X.,Y3-I*25
CALL LINE (-2,0)
MOVETO 15,Y3-I*25+6
PRINT USING"###";I*Y0;
PRINT" g";
NEXT
IF D.<4 OR D.>9 THEN F3$="##.#"
IF D.>3 AND D.<7 THEN F3$="###"
IF D.>6 AND D.<10 THEN F3$="#.##"
IF D.<7 THEN U$=" ms" ELSE U$=" s   "
RESTORE 3
FOR I=1 TO D.:READ D0!:NEXT
FOR I=0 TO 5
MOVETO X.+I*80,Y3
CALL LINE (0,2)
MOVETO X.+I*80-22,Y3+14
IF I<>0 THEN PRINT USING F3$;I*D0!;ELSE PRINT USING"###";I;
PRINT U$;
NEXT
TEXTMODE 0
FRAMERECT VARPTR(B9(0))
C1!=VARPTR(C(0)):CALL C1!(VARPTR(C0(0)))
PICTURE,B0$
IF O7=T5 THEN PICTURE(O8*4,0)
```

```
RETURN
3 DATA 2,4,10,20,40,100,.2,.4,1,2
!
CALL S4("Sorry, "+S5$+" is not a valid Data file.")
CLOSE#2
CHAIN"View",,ALL,DELETE 2-5
9
WINDOW OUTPUT 1
D.=P(T2)
D1=P(G0)
IF D1=1 THEN Y0=100:G=4ELSE Y0=25:G=1
X9=X.
PS=0
B3'=P5/G
PICTURE ON
MOVETO X.,Y3-S(0)-B3!
FOR I=1 TO 100
X9=X9+4
LINETO X9,Y3-S(I)-B3!
IF P3<S(I) THEN P3=S(I)
NEXT
PICTURE OFF
B0$=PICTURE$
P1=P3*G+B5
RETURN
SUB S4(M3$)STATIC
BEEP
WINDOW 2
CLS
MOVETO 5,21 :PRINT M3$;
BUTTON 1,1,"OK",(405,5)-(435,25),1
J0=DIALOG(0)
7 IF DIALOG(0)<>1 THEN 7
BUTTON CLOSE 1
END SUB
5
4
1 B00%=1:GOTO 5
3 B00%=3
5
-DEFINT A-Z
WINDOW 2
CLS
INITCURSOR
MOVETO 5,40
IF B00%<3 THEN PRINT "Trigger sampling when the force exceeds                    grams.";
IF B00%>2 THEN PRINT "Offset the plot and measurements by                        grams.";
BUTTON 1,1,"OK",(390,25)-(430,46),1
BUTTON 2,1,"Cancel",(435,25)-(500,46),1
R0(1)=265:R0(0)=25:R0(3)=340:R0(2)=46
FRAMERECT VARPTR(R0(0))
C8=273:R2=40:R=1:C2=1
IF B00%<3 THEN X=P(T1):N=X
IF B00%>2 THEN X=P(F4) :N=X
GOSUB 8
A0=T5
WHILE A0=T5
A3=DIALOG(0) :M00=MOUSE(0)
WHILE M00=0 AND A3<>1:M00=MOUSE(0):A3=DIALOG(0):WEND
IF A3=1 THEN A0=F
F5=F
WHILE M00<0
C2=INT((MOUSE(3)-C8+7)*.125)
IF C2<1 OR C2>4 GOTO 6
X=N
IF C2=1 AND B00%>2 THEN X=-X:GOTO 7
H$=STR$(X)
IF LEN(H$)>4-C2 THEN H$=MID$(H$,LEN(H$)+C2-4,1)ELSE H$="0"
IF VAL(H$)=9 THEN X=X-9*10^(4-C2)ELSE X=X+10^(4-C2)
7
N=X
GOSUB 8
```

```
6
IF F5=F THEN GOSUB 9
M00=MOUSE(0)
WEND
WEND
BUTTON CLOSE 1
BUTTON CLOSE 2
CLS
WINDOW 1
A0=T5
IF DIALOG(1)=1 AND B00%<3 THEN P(T1)=N:P(T4)=1:A0=F
IF DIALOG(1)=1 AND B00%>2 THEN P(F4)=N:A0=F
IF B00%>1 GOTO 11
CHAIN "H",3,ALL,DELETE 4-2
11
CHAIN "H",7,ALL,DELETE 4-2
8
MOVETO C8+32*INT((C2-1)*.25),R2+(R-1)*20
IF B00%>2 THEN IF X<0 THEN PRINT "-";ELSE PRINT "+";
IF B00%<3 AND ABS(X)<1000 THEN PRINT "0";
IF ABS(X)<100 THEN PRINT "0";
IF ABS(X)<10 THEN PRINT "0";
PRINT RIGHT$(STR$(X),LEN(STR$(X))-1);
RETURN
9
S6=0
M00=MOUSE(0)
WHILE S6<49 AND M00<0
S6=S6+1
M00=MOUSE(0)
WEND
IF S6=49 THEN F5=T5
RETURN
2
2
    DEFINT A-Z
    P9=0
    LPRINT CHR$(24);CHR$(27);CHR$(99);
    HIDECURSOR
    IF P(P4)=T5 THEN GOSUB 7
    IF P(P4+1)=T5 THEN GOSUB 9
    IF P(P4+2)=T5 THEN GOSUB 6
    IF P9<>1 THEN LPRINT:LPRINT:LPRINT TAB(25);"HYBOND DYNAMIC BOND FORCE SYSTEM"
    IF P9>1 THEN LPRINT CHR$(12);
    LPRINT CHR$(27);CHR$(99);
    SHOWCURSOR
    WINDOW 1
    WINDOW OUTPUT 2
    CHAIN "H",1,ALL,DELETE 2-3
10
    RESTORE 8
    J=0
    WHILE J<>23
        READ J
        FOR I=0 TO J
            READ S8(I)
            NEXT
        C1!=VARPTR(S8(0))
        CALL C1!
        WEND
    RETURN
7
    WINDOW 2
    GOSUB 10
    LPRINT CHR$(31);"4";
    LPRINT CHR$(27);CHR$(99);
    P9=1
    RETURN
9
    LPRINT
```

```
        LPRINT TAB(25);"Plot of ";
        IF B2=3 THEN LPRINT"1st"; ELSE LPRINT"2nd";
        LPRINT" Bond ";
        IF B7$<>"" THEN LPRINT"from DATA file ";B7$;"."ELSE LPRINT"."
        IF O7=F GOTO 5
        LPRINT TAB(25);"Plot of ";
        IF O1=3 THEN LPRINT "1st";ELSE LPRINT"2nd";
        LPRINT" Bond from OVERLAY file ";O4$;"."
5
        LPRINT
        WINDOW 1
        GOSUB 10
        LPRINT CHR$(31);"4";
        P9=P9 OR 2
        RETURN
6
        WINDOW 1
        GOSUB 1
        GOSUB 10
        P9=P9 OR 4
        O5=T5
        RETURN
8
        DATA 32,&H41FA,&H38,&H2008,&H41FA,&HA,&H2140,&H12
        DATA &HA000,&H4E75
        DATA 0,0,0,0,0,0,0,0,0,0,0,0,0,0,0,0,0,0,0,0
        DATA &H62E,&H5072,&H696E,&H7400
        DATA 39,&H48E7,&H60,&H41FA,&H22,&H226D,0,&H2469,0
        DATA &H43EA,2,&H2149,&H1C
        DATA &H43EA,16,&H2149,&H20
        DATA &HA004,&H4CDF,&H600,&H4E75
        DATA 0,0,0,0,0,0,0,0,0,0,0,0,&HFFFD,4,0,0,0,0,0,0
        DATA 23,&H41FA,6,&HA001,&H4E75
        DATA 0,0,0,0,0,0,0,0,0,0,0,0,&HFFFD,0,0,0,0,0,0,0
1
        R2=35
        CS=260
        CLS
        RESTORE 11
        READ I,J,J0$
        WHILE I<>-1
            MOVETO I,J
            PRINT J0$;
            READ I,J,J0$
            WEND
        READ R0(1),R0(0),R0(3),R0(2)
        WHILE R0(1)<>-1
            FRAMERECT VARPTR(R0(0))
            READ R0(1),R0(0),R0(3),R0(2)
            WEND
        FOR I=1 TO 10
            READ R,C2
            IF C2>8 THEN X=1ELSE X=0
            X=IO(R,X)
            GOSUB 12
            NEXT
        RETURN
11
        DATA 120,15,"BONDER IDENTIFICATION",125,35,"Manufacture Date"
        DATA 125,55,"Serial Number",120,95,"BOND PARAMETERS :"
        DATA 250,95,"1st Bond",320 ,95,"2nd Bond"
        DATA 125,115,"Ultrasonic Energy",125,135,"Bond Time"
        DATA 125,155,"Bond Force",120,195,"BONDER PARAMETERS"
        DATA 125,215,"Stage Temperature",125 ,235,"EFO Power",-1,0,""
        DATA 120,20,390,60,120,100,390,160,120,200,390,240,-1,0,0,0
        DATA 1,5,2,5,5,1,5,10,6,1,6,10,7,1,7,10,10,5,11,5
12
        MOVETO CS+32*INT((C2-1)*.25),R2+(R-1)*20
        IF X<1000 THEN PRINT"0";
        IF X<100 THEN PRINT"0";
```

```
IF X<10 THEN PRINT"0";
PRINT RIGHT$(STR$(X),LEN(STR$(X))-1);
RETURN
```

DESCRIPTION OF THE PREFERRED EMBODIMENT

FIG. 1 is a pictorial view of the preferred embodiment of the dynamic force measurement system 10 of the present invention. The system comprises a central processing unit 12 with floppy disk drive 16 and graphic display 14.

Printout of the force data and graphic data are provided on the conventional graphics printer 24 over the printer connection 26. A user interface is provided by a conventional user mouse 20 over mouse connection 22. The dynamic force program and data storage is provided on auxiliary storage means by conventional floppy disk 28.

The central processing unit 12 of the preferred embodiment is, for example, the Macintosh Computer manufactured by Apple Computer, Inc. using a 32-bit word with 128K memory and conventional interface circuitry for the mouse 20, floppy disk 16, graphics display 14, and graphics printer 24.

The sensor interface device 30 provides the basic system interface between the sensor device 40 over sensor connection 34 and processor connection 32. Conventional RS 422 interface architecture enables the central processor unit 12 to interface with the sensor interface device 30. The sensor device 40 rests on support platform 42. A conventional wire bonding device is depicted at 50 with bond tool 52.

In operation, a user defines initializing data for the particular operating environment and the operating parameters for a given force evaluation run through the conventional operation of the mouse 20 on conventional Macintosh TM type menu selection options provided by the data force program presented on the graphics display 14. Upon selection by the user of the desired operating parameters, the wire bonding device 50 is activated causing the bond tool 52 to strike the sensor device 40.

The sensor device 40 generates a continuous electronic sensor force signal which is responsive to and representative of the force applied to the detecting surface of the sensor device 40. The force signal is transmitted to the sensor interface device 30 over sensor connection 34. The sensor interface device 30 continuously monitors the sensor signal and converts the sensor force signal into a binary or numeric representation.

After the sensor interface device 30 detects the proper triggering mechanism such as, for example, the satisfaction of a user defined force threshold parameter, the binary representation is stored in temporary storage means (see FIG. 3) within the sensor interface device 30.

The sensor interface device 30 continues to take additional sample readings of the force at a frequency determined by a user selected sampling rate. After taking a specified number of samples over a time duration specified by the user or specified by the system, all collected force data is transferred to the central processing unit 12.

The central processing unit 12 manipulates, operates or conducts statistical analysis of the force data according to user selected program options. Principally, the central processing unit 12 causes the display on the graphics display 14 of the time sequence of force values to provide a force profile 15. In accordance with user options, the force profile 15 may be provided as a hard copy output 38 on the line printer 24.

Figure 2:
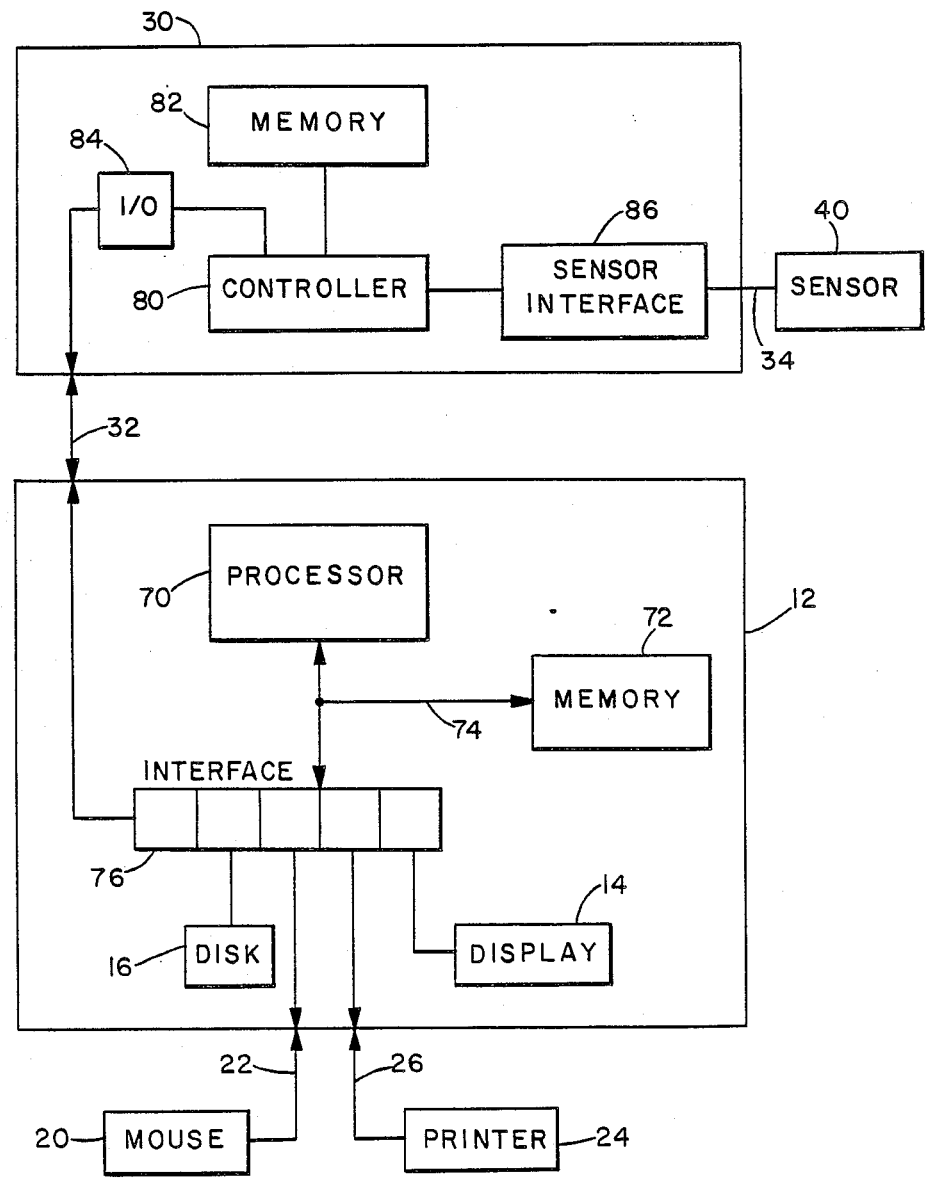
FIG. 2 is a block diagram of the major components of the system.

FIG. 2 is a block diagram of the major system components of the dynamic force measurement system 10. The central processing system 12 is a conventional computer system including a processor 70 with expandable semiconductor memory 72. Internal connecting means 74 provides interconnection between the processor 70, the memory 72 and interface circuitry shown generally at 76. The interface circuitry 76 provides interface means to the mouse 20 over mouse connection 22, interface to the floppy disk 16, the graphics display 14, and the graphics printer 24 over connection 26. The central processing unit 12 also includes a conventional RS-422 serial modem type interface to the sensor interface device 30 over connection 32.

The sensor interface device 30 includes the interface controller 80 and firmware memory 82 which contains the operating interface program instructions for the interface controller 80. Also included is interface circuitry 84 to the central processor 12 for communicating with the central processor unit 12 over the RS-422 serial interface.

Figure 6:
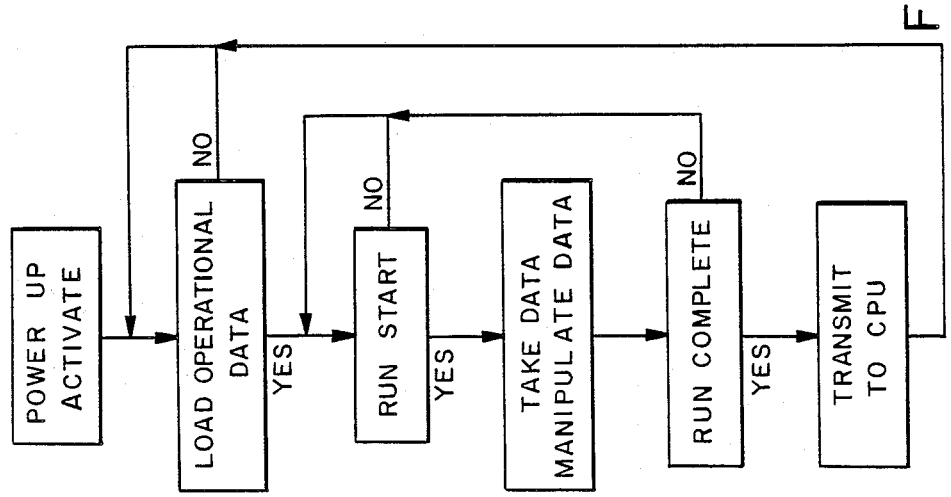
FIG. 6 is a flow chart of the major functions performed by the controller of the sensor interface device.

The sensor interface device 30 also includes sensor interface circuitry 86 for monitoring and converting the sensor force signal of the sensor device 40. The flow chart of the dynamic force operating program maintained in memory 72 of central processor unit 12 is shown in FIG. 6. This program instructions enable the user to define and select various environmental data and to define and select operating environmental data or operating parameters required by the system to conduct a given force evaluation or operational run.

The listing of the dynamic force operating program is shown in Table A.

Figure 3:
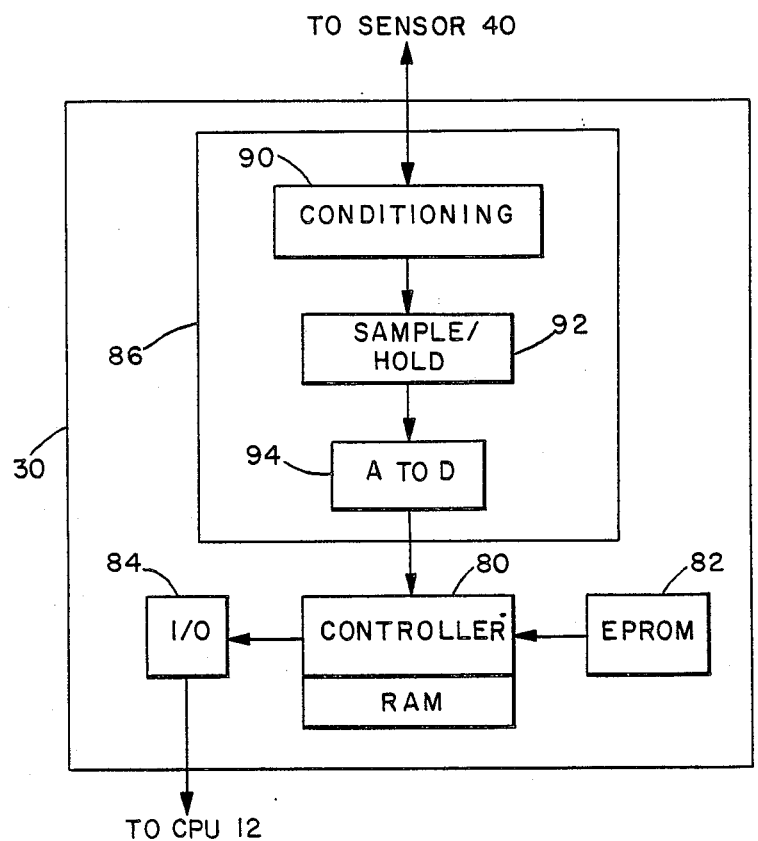
FIG. 3 is a block diagram of the major components of the sensor interface device.
Figure 7:
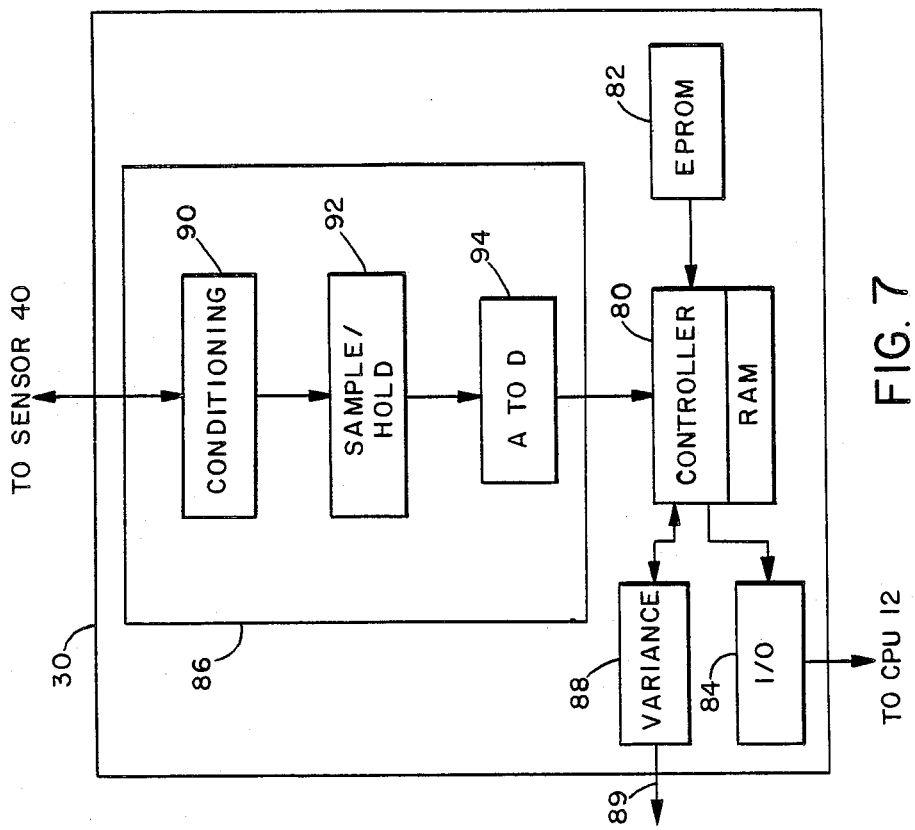
FIG. 7 is a block diagram of the major components of an alternate embodiment of the sensor interface device which provides a feedback control signal.

The controller 80 of the sensor interface device 30 operates pursuant to interface program instructions maintained in firmware memory 82. The flow chart of the major functions performed by the interface programmed instructions is shown in FIG. 6. FIG. 3 is a more detailed block diagram of the sensor interface device 30. In the preferred embodiment, the controller 80 is a Motorola 146805 8-bit microprocessor and is connected to 8K of EPROM firmware. The interface program instructions, shown in the flow chart in FIG. 7, are permanently loaded within the EPROM. The controller 80 includes sufficient Random Access Memory (RAM) storage for system operating parameters and temporary force data.

The sensor interface device 30 includes a conventional RS-422 serial input/output (I/O) interface 84 for communication with the central processor unit 12. The I/O interface 84 connects directly to the controller 80 in a conventional manner.

The sensor interface circuitry 86 includes a force signal conditioning circuitry 90 which provides the interface signal conditioning circuitry for the sensor. Also included is sample and hold circuitry 92 which is enabled and operated by the controller 80 to present the sensor force signal to an analog-to-digital converter circuitry 94. The analog-to-digital converter circuitry 94 generates a binary digital representation of the magnitude of the sensor force signal. The sample and hold circuitry 92 holds the analog signal for such time as is necessary to make the analog-to-digital conversion. After the analog-to-digital conversion by the analog-to-digital converter circuitry 94, the controller 80 completes the particular force reading by manipulating the date in a standard form then storing the binary representation of the sensor force signal in its temporary RAM memory.

The controller 80 provides initial analysis of the digital representation of the sensor force signal for initial evaluation purposes, such as, for example, threshold detection. Initial threshold detection may included monitoring the force readings until such reading satisfy a certain minimum condition after which further force readings are stored.

As an alternative, the sensor interface device 30 includes provisions for an external trigger to the sensor interface circuitry 86. A further triggering alternative is provided as a direct response to a manual user triggering input from the central processing unit 12. The operation of the controller 80 is controlled by the interface program instructions maintained within firmware 82. Selections of software options and control sequences is effected through operating parameters received by the interface device 30 from the central processing unit 12. These operating parameters include such things as, for example, triggering mechanism, sample rate, and sample duration.

Figure 4:
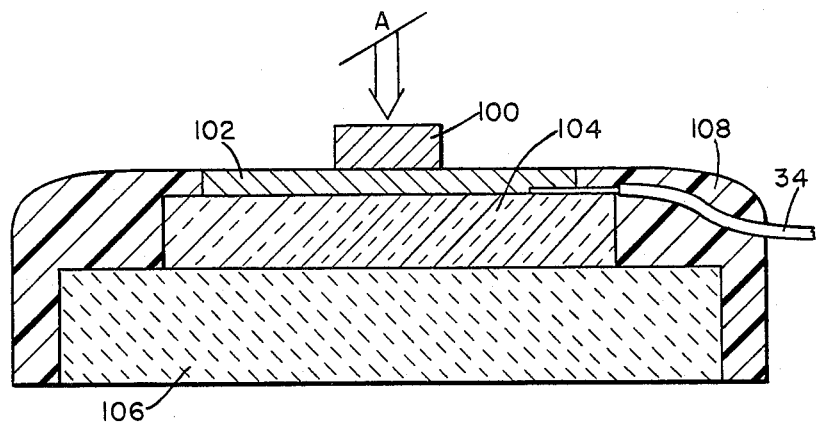
FIG. 4 is a pictorial representation of the sensor device.

FIG. 4 is a diagrammatic representation of the sensor device 40. The sensor device 40 is capable of generating a continuous electronic sensor force signal having a predetermined and repeatable relationship with the force applied to the sensor. Further, the response between the application against the sensory device 40 and the evaluation of the sensor signal in its digital representation by the controller 80 of the sensor interface device 30 must be substantially instantaneous and preferably experience a propagation delay of not greater than $10^{-5}$ seconds.

In the application of the dynamic force measurement system 10 is a bond force measuring device, the sensor device 40 is preferably designed to the following of specifications.

| | |
|---|---|
| Maximum Overforce | 4000 grams normal force |
| | 900 grams tangential force |
| Maximum Total Error | 4 grams |
| Operating Temperature | 10° C. to 150° C. |
| Package Dimensions | ¼ × ¼ inch² ceramic substrate with 5 lead TEFLON ™ ribbon cable |
| Sensor Dimensions | 2 × 2 mm² |
| Active Sensing Area | 600 × 600 μm² pedestal rising approx. 800 μm above the ceramic substrate surface. |
| Weight | approx. 0.2 grams |

In the preferred embodiment of the dynamic force measurement system 10 as a bond force measurement device a satisfactory sensor device 40 is a IF 4010 ¼ inch square sensor on a ceramic substrate (TP 4010) by Transensory Devices, Inc. of Fremont, Calif.

As shown in FIG. 4, the sensing device 40 includes a substrate 106 preferably made out of a ceramic material. Above the ceramic substrate 106 is a galss substrate 104. The sensing element 102 is applied over the glass substrate 104. The sensing element may be, for example, a resistive strain gauge type wheatstone bridge integrated circuit transducing cell which requires for operation a regulated 5 volts direct current supply as a reference to the sensor and as power for the sensing circuitry. Electrical connection 34 is provided from the sensing element 102. Applied to the sensing element 102 is a pressure pedestal 100 which is designed to receive an applied force in the direction represented by arrow A. The combined layers are packaged and maintained in a binding epoxy material 108. In this configuration, the sensing element 102 provides a continuous electronic sensor force signal which is responsive to and representative of the force detected by the sensing element 102 between the pedestal 100 and the ceramic substrate 106. The typical sensor force signal response is a linear 0.0 to 100.0 millivolts for an applied force of 0.00 to 2.00 pounds.

Figure 5:
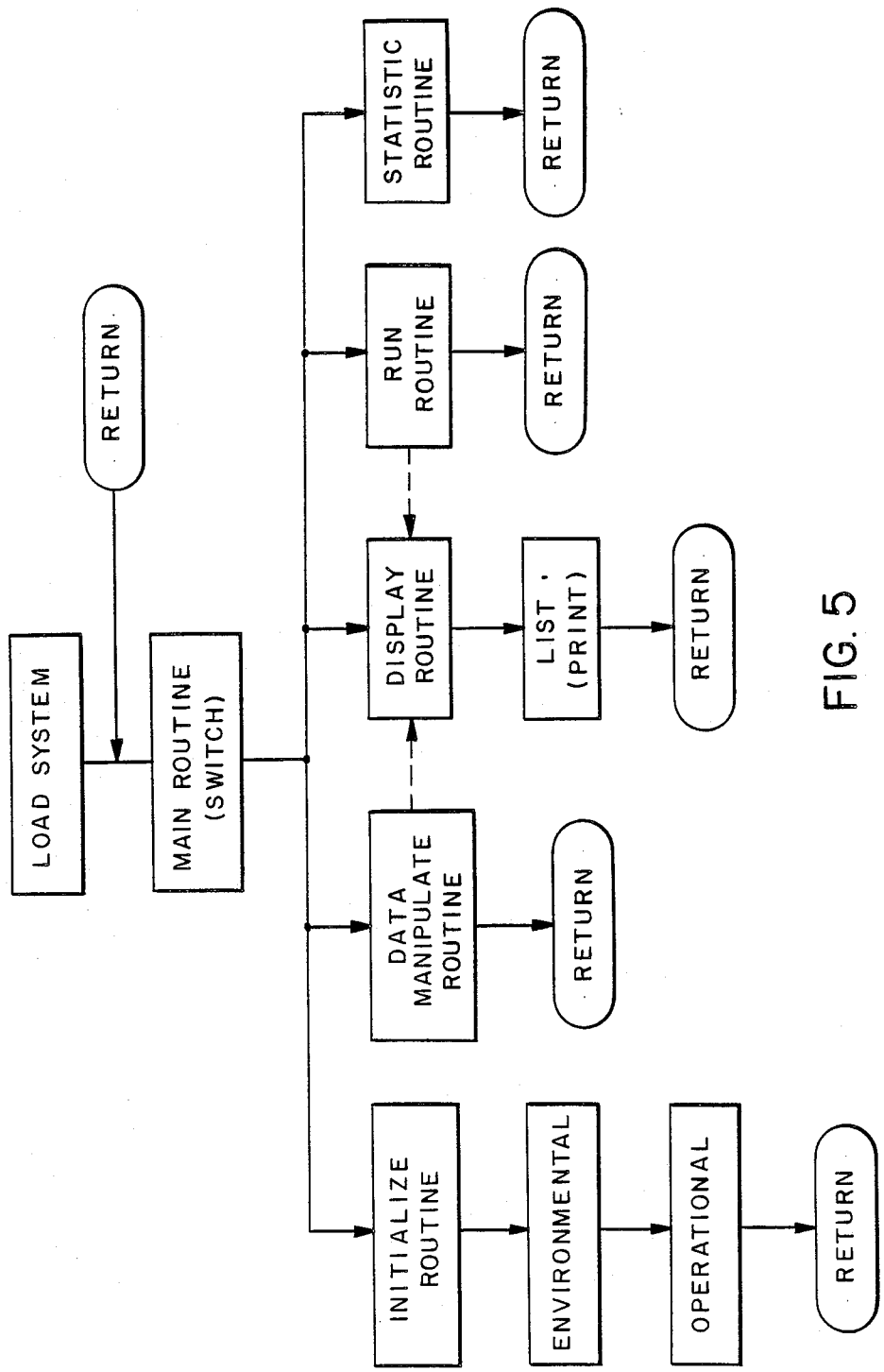
FIG. 5 is a flow chart of the major functions of the dynamic force program of the central processing unit.

FIG. 5 is a flow chart of the major functions performed by the program instructions of the dynamic force program. The dynamic force program instructions are maintained on floppy diskette which are loaded into the central processing unit 12 through the disk drive 16 in a conventional manner for the Macintosh ™ operating system. After loading, operation of the central processing unit 12 is effected through the dynamic force program. Subsequent to system loading, the main routine of the dynamic force program enables the user to select specific systems operations pursuant to a user generated program instructions sequences. The user may select the system initialization routine which provides means for the initialization of environmental data relevant to the nature of the given operational run sequence. Accordingly, environmental information such as apparatus description, equipment or test circumstances, date and operation run sequence may be defined and stored for correlation with the run data.

The initializing routine may then provide means for initialization of operational data relative to the various operational parameters of the operational run sequence. Specifically, operational data such as sensor calibration, time offset of data readings from triggering, and the triggering mechanism selected from the manual, external or threshold alternatives are user selected under program instruction. The expected force range of the force data is defined as are the sampling rates for which the readings will be taken and the sampling duration. In the preferred embodiment one hundred and one samples are taken at the specified sampling rate. An alternative embodiment may provide a selectable sampling duration.

After the operational data has been defined, program control is returned to the main routine for further user selection. The user may select the data manipulation routines of the dynamic force program instructions to manipulation of stored data files relative to stored operational runs of the dynamic force measurement system. The data manipulation provides means for recalling specified data files, renaming data files, or deleting data files. During these data manipulation operations, the user can, under program control, request the graphical presentation of a selected data file with a second data file on the graphic display for visual comparison. After the desired data manipulations have been performed, control is returned to the main routine.

The user may select the display routine to display a specified data file. The display routine includes means for recalling the graphical and numerical information relative to a given data file, plus its environmental data for display on the graphics display for user evaluation. Further, under user selection, in an alternative embodiment, a listing routine includes means for printing graphical presentation on the graphical display on the graphics printer. Subsequent to the user selected options, control is returned to the main routine.

Upon return to the main routine the user may select the run routine to initiate and conduct the actual operational run sequence. The run routine provides means for transmitting to the sensor interface device all operating parameters including trigger mechanism and run sample rate. Upon activation of the sensor interface device, the run routine time outs and waits pending the return from the sensor interface device the run force data. Upon return of the run force data from the sensor interface device, the run routine includes means for calling the display routine to display the run force data on the graphics display. All one hundred one force readings are plotted on a force versus time scale to provide a force profile and saved in a preselected save file. Control is returned to the main routine.

The user may then request the selection of assorted statistical analysis to analyze and determine statistical information of the run force data, such as, for example, mean force, force rate, percent overshoot, peak force, total energy of the force, and force duration. The statistical routine includes means for generating, calculating and displaying and saving this statistical information relative to the operational run sequence.

Upon completion of the presentation of this information, control is returned to the main routine for user selection of the next appropriate sequence for the next operation.

FIG. 6 is a flow chart of the major functions performed by the controller of the sensor interface device. Upon activation of power to the sensor interface device, a power activate routine initializes the controller operations.

Upon detection of a load sequence from the central processing unit, the program instructions of the sensor interface device detects and loads the operating parameters for an operational run. This operational parameters include the definition of, for example, triggering mechanism and sample run rate.

Upon activation and loading of the operating parameters, the run start routine of the interface program instructions of the sensor interface device begins sampling test data for satisfaction of, for example, the threshold triggering parameter.

Upon detection of a force reading sufficient satisfies the triggering parameter, the program instructions begin sampling data at the preselected sample rate.

Sequential sample readings are taken, manipulated and stored in the RAM memory of the controller. Upon completion of all readings, all force data is returned to the central processing unit.

Upon return of such force data, the sensor interface device returns to wait the next receipt of operating parameters.

Table A is a listing of the program instructions written in Apple Basic for the dynamic force program of the central processing unit.

A function block diagram of an alternate embodiment of the sensor interface device of dynamic force measurement system is shown in FIG. 7. In this alternative embodiment, the program instructions of the central processing unit and the sensor interface device include means for transmitting from the sensor interface device to the central processing unit subsets of force reading of individual force readings during a given operational run. The central processing unit includes means for accepting the intermediate force data and performing a real time analysis of such data relative to a standard force profile. The standard force profile would provide, for example, a profile which provides for the optimal force value plus an acceptable deviation from such value.

Real time force data would be compared against the standard force values to generate a positive and/or negative variance signal. The variance signal may generate a simple binary below/above variance indication or, in the alternative, provide a means such as voltage or binary representation for indicating a magnitude of the variance from the standard signal.

As shown in FIG. 7, the alternate embodiment is substantially similar to that shown in FIG. 3, however, the system interface device include additional circuitry 88 to generate the positive/negative variance signals in connection 89.

It is important to note that this variance signal may be generated within the central processing unit, depending upon system applications.

It is clear that modifications of this invention can be made to the disclosed embodiment without departing from the scope of the invention. The invention is therefore not limited to the disclosed embodiment but is defined by the appended claims.

What we claim is:

1. A dynamic bond force measurement system for taking a series of force measurements of force applied by a wire bonding tool, the system comprising:
    a sensor device for positioning beneath a wire bonding tool, comprising a substrate platform, a transducer element mounted on said platform, and a pressure pedestal mounted on said transducer element for receiving the force applied by a wire bonding tool;
    the transducer element comprising means for detecting forces between the pedestal and the substrate platform in the range form 0.00 to 2.00 lbs. and for producing a continuous analog output signal in the range form 0.00 to 100.00 millivolts in relation to said force;
    a sensor interface device for receiving said analog output signal, the interface device comprising analog to digital converter means for converting said analog output signal, data storage means for storing discrete values of said digital output signal at a preselected sample rate, triggering means for initiating said data storage, and output means for transmitting said stored digital output signals; and
    data processing means for receiving said digital output signals from said interface device, means for storing said received signals, and means for generating from said signals a graphical representation of the applied force relative to time.

2. The system as claimed in claim 1, wherein said triggering means includes control means responsive to a predetermined triggering signal to initiate said signal storage.

3. The system as claimed in claim 2, wherein said triggering signal comprises detection of a preselected force threshold value.

4. The system as claimed in claim 3, including means for manually varying said threshold value.

5. The system as claimed in claim 2, including means for providing alternative data storage triggering modes, the alternative modes including a manual triggering input mode, a force threshold value detection mode, and an automatic triggering mode.

6. The system as claimed in claim 1, including means for manually controlling the sampling rate.

7. The system as claimed in claim 6, further including means for manually controlling the sampling duration during which data is stored, said data storage means comprising means for storing said digital signals at a predetermined sampling rate until expiry of said selected sampling duration, and means for providing said stored signals to said output means for transmitting to said data processing means on completion of said selected sampling duration.

8. The system as claimed in claim 7, wherein the sampling duration comprises the time needed to collect a predetermined number of signals at a selected sample rate.

9. The system as claimed in claim 8, wherein the predetermined number of signals comprises at least 101.

10. The system as claimed in claim 1, wherein said sensor device weighs approximately 0.2 grams, said transducer element has dimensions of approximately $2 \times 2$ mm$^2$, and said sensor device has an active sensing area of approximately $600 \times 600$ $\mu$m$^2$.

11. The system as claimed in claim 10, wherein the substrate platform is of area $\frac{1}{4} \times \frac{1}{4}$ inch$^2$, the pedestal area is $600 \times 600$ $\mu$m$^2$, and the pedestal rises approximately 800 $\mu$m above the substrate surface.

12. The system as claimed in claim 11, wherein the substrate platform comprises a ceramic substrate, and a glass substrate mounted above the ceramic substrate, the transducer element is mounted on the glass substrate and binder material extends around the peripheries of the combined substrate and transducer layers to secure them together, leaving the upper surface of the transducer element exposed, the pedestal being mounted on the exposed upper surface of the transducer element and comprising means for receiving an applied force normal to its surface.

13. The system as claimed in claim 1, wherein said data processing means includes manual input means for enabling user selection of various operating parameters including a triggering mode selected from manual, external, or force threshold, a sampling rate, a sampling duration for each force measurement, and user selection of a series of data manipulation routines for manipulating previously stored data, including means for comparing the graphical representation of two different sets of force measurements, and a series of various statistical data analysis routines including mean force, force rate, percent overshoot, peak force, total energy and force duration.

14. The system as claimed in claim 1, wherein said sensor interface device includes a sample and hold register having an input for receiving said analog output signal and an output connected to said analog to digital converter, said sample and hold register comprising means for holding an analog signal for a time period required for analog to digital conversion of the previous signal and for providing said held signal at its output on expiry of said time period, and a microprocessor connected to the output of said analog to digital converter for receiving said digital output signal, said data storage means comprising a random access memory device connected to said microprocessor, said microprocessor being connected to a read only memory device containing an operating program for said microprocessor, said operating program including means for storing discrete values of said digital output signal on detection of a selected threshold digital output signal until expiry of a preselected data storage time, and means for providing said stored signals to said data processing means on expiry of said data storage time.

* * * * *